United States Patent [19]

Murray

[11] 4,363,771

[45] Dec. 14, 1982

[54] PROCESS FOR PREPARING NON-ORIENTED POLYOLEFIN FILM

[75] Inventor: James G. Murray, East Brunswick, N.J.

[73] Assignee: Mobil Oil Corporation, New York, N.Y.

[21] Appl. No.: 276,779

[22] Filed: Jun. 24, 1981

Related U.S. Application Data

[63] Continuation-in-part of Ser. No. 108,924, Dec. 31, 1979, abandoned.

[51] Int. Cl.³ .............................................. D04N 1/54
[52] U.S. Cl. ..................................... 264/119; 264/126
[58] Field of Search ................................ 264/119, 126

[56] References Cited

U.S. PATENT DOCUMENTS 3,400,186  9/1968  Wiley .................................. 264/126
3,975,481  8/1976  Baumgaertner ..................... 264/126

Primary Examiner—James R. Hall
Attorney, Agent, or Firm—Charles A. Huggett; James F. Powers, Jr.; James P. O'Sullivan, Sr.

[57] ABSTRACT

A method for producing non-oriented film that comprises depositing high molecular weight polyolefin powder on a smooth non-adherent substrate, sintering the deposited powder, contacting the sintered powder with rollers at the sintering temperature at a pressure sufficient to effect densification of the polyolefin normal to the surface but insufficient to effect significant longitudinal flow of the polyolefin to form a void-free film, and stripping said film from said substrate.

2 Claims, No Drawings

PROCESS FOR PREPARING NON-ORIENTED POLYOLEFIN FILM

CROSS-REFERENCE TO RELATED APPLICATIONS

This application is a continuation-in-part of copending application Ser. No. 108,924, filed Dec. 31, 1979 now abandoned.

BACKGROUND OF THE INVENTION

1. Field of the Invention

This invention is directed to a method for preparing non-oriented film or sheet from high molecular weight polyolefin powder.

2. Description of the Prior Art

It has been proposed to produce non-oriented film by powder spray, using thermal levelling techniques. Such techniques, however, require the use of temperatures well above the melt temperature of the polyolefin.

Insofar as is now known, the process of this invention has not been proposed.

SUMMARY OF THE INVENTION

A method for producing a non-oriented film that comprises depositing high molecular weight polyolefin powder on a smooth non-adherent substrate, sintering said deposited powder at a sintering temperature just below the melting temperature of the polyolefin, rolling in a longitudinal direction the sintered powder held at the sintering temperature with at least one unheated roller at a pressure sufficient to effect densification of the polyolefin normal to its surface but insufficient to effect significant longitudinal flow of the polyolefin to form a non-oriented void-free film, and quenching and stripping said film from said substrate.

DESCRIPTION OF THE SPECIFIC EMBODIMENTS

The polyolefins contemplated herein are high molecular weight homopolymers and copolymers of $C_2$–$C_4$ olefins. Such polymers include high, low, and medium density polyethylene; polypropylene; polybutene-1; ethylene-propylene copolymers; and butene-ethylene copolymers. These polymers are prepared by processes and techniques well known in the art and many are available commercially.

The polyolefin is applied in powdered form. Such form can be achieved by any means well known in the art, such as by grinding. Polymerization processes are known in which the polyolefins are produced in powder form that can be used directly in the process of this invention. In general, the polyolefin has an average particle size of 100 microns or less.

As used throughout the specification and claims, the terminology "non-adherent substrate" has reference to any material (usually rigid or semi-rigid) having a surface to which a polyolefin film formed as described herein will not adhere, so that the film can be readily stripped from the substrate. Such substrates include sheets or plates made from aluminum, steel and the like, or a material that is surface coated with polytetrafluoroethylene, polyethylene terephthalate and the like. The surface should be smooth and free of imperfections.

In forming a film in accordance with this invention, the polyolefin is applied to the surface of the substrate, as by powder spraying. Then, the thus applied polyolefin powder is heated to a temperature sufficient to sinter the material, i.e., a temperature just below the melting or fusion temperature.

After sintering, the polyolefin on the substrate, held at the sintering temperature, is rolled longitudinally with a roller or rollers at a pressure that is sufficient to effect densification of the polyolefin but insufficient to effect significant or appreciable longitudinal flow of the polyolefin. In general, the pressure will be between about 100 and about 5,000 psi. Preferably, the sintering and rolling operations are carried out in an inert atmosphere, such as nitrogen. In order to avoid orientation, the rollers are unheated, i.e., at ambient (room) temperature.

The result of such operation is to form a void-free film having good physical properties and low, but measurable, Elmendorf tear characteristics. The film is not oriented. Such film is readily recovered by quenching the substrate and film assembly and stripping the film from the substrate.

EXAMPLE

A sample of high molecular weight (HLMI=7.5) high density polyethylene powder, which would pass through an 80 mesh screen and which had been directly produced in a commercial polymerization reactor, was uniformly deposited on an aluminum plate and sintered by heating the aluminum plate to 150° C. in a nitrogen atmosphere.

While maintaining the aluminum plate at a temperature of 150°–160° C., the plate was rolled longitudinally with an unheated roller several times while maintaining a pressure sufficient to cause densification of the polymer normal to the surface but insufficient to cause significant longitudinal flow of the polymer with the resultant formation of a non-oriented void-free film.

This film was quenched and stripped from the substrate. There was obtained a 9 mil film which showed no orientation between crossed polaroids. The physical properties of this film are given in the following table. In addition to generally good physical properties, the film had low but measurable Elmendorf tear characteristics as the result of its non-oriented state.

TABLE

| | |
|---|---|
| Tensile Yield psi × $10^3$ | 3.35 (3.23–3.44) |
| Tensile Break psi × $10^3$ | 2.98 (2.77–3.20) |
| Elongation % | 79 (32–122) |
| Elmendorf Tear g/mil | 67 (54–85) |

Although the present invention has been described with preferred embodiments, it is to be understood that modifications and variations may be resorted to, without departing from the spirit and scope of this invention, as those skilled in the art will readily understand. Such modifications and variations are considererd to be within the purview and scope of the appended claims.

What is claimed is:

1. A method for producing a non-oriented film that comprises depositing high molecular weight polyolefin powder on a smooth non-adherent substrate, sintering said deposited powder at a sintering temperature just below the melting temperature of the polyolefin, rolling in a longitudinal direction the sintered powder held at the sintering temperature with at least one unheated roller at a pressure sufficient to effect densification of the polyolefin normal to its surface but insufficient to effect significant longitudinal flow of the polyolefin to form a non-oriented void free film, and quenching and stripping said film from said substrate.

2. The method of claim 1, wherein said polyolefin is high density polyethylene.

* * * * *